United States Patent
Popelak et al.

[11] 3,865,838
[45] Feb. 11, 1975

[54] (5-INDOLYLOXY)-ACETIC ACID COMPOUNDS AND THERAPEUTIC COMPOSITIONS

[75] Inventors: Alfred Popelak, Rimbach; Kurt Stach, Mannheim-Waldhof; Max Thiel, Mannheim; Wolfgang Schaumann, Heidelberg; Harald Stork, Mannheim-Feudenheim, all of Germany

[73] Assignee: Boehringer Mannheim GmbH, Mannheim, Germany

[22] Filed: July 11, 1973

[21] Appl. No.: 378,356

[30] Foreign Application Priority Data
July 29, 1972 Germany............................ 2237361

[52] U.S. Cl..... 260/326.13 R, 424/274, 260/326.16
[51] Int. Cl. ...................... C07d 27/00, C07d 27/56
[58] Field of Search ........................... 260/326.13 R

[56] References Cited
UNITED STATES PATENTS
3,267,117  8/1966  Allen, Jr. et al........... 260/326.1 BR OTHER PUBLICATIONS
Chemical Abstracts, (1967), Paragraph 90, 603J Article by Grinev et al.

*Primary Examiner*—Elbert L. Roberts
*Attorney, Agent, or Firm*—Burgess, Dinklage & Sprung

[57] ABSTRACT

New (5-indolyloxy)-acetic acid compounds of the formula

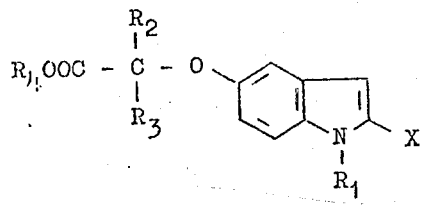

wherein:
$R_1$, $R_2$, $R_3$ and $R_4$, which may be the same or different, are hydrogen or alkyl;
X is hydrogen or carboxyl or alkoxycarbony;
and the pharmacologically acceptable salts thereof; are outstandingly effective in the treatment and prophylaxis of coronary-arterial diseases and artherosclerosis.

11 Claims, No Drawings

(5-INDOLYLOXY)-ACETIC ACID COMPOUNDS AND THERAPEUTIC COMPOSITIONS

The present invention is concerned with new (5-indolyloxy)-acetic acid compounds and with therapeutic compositions containing the same.

The new (5-indolyloxy)-acetic acid derivatives of the present invention are compounds of the formulae:

$$R_4OOC - \underset{\underset{R_3}{|}}{\overset{\overset{R_2}{|}}{C}} - O - \text{[indole]} - X \quad (I),$$

wherein:

$R_1$, $R_2$, $R_3$ and $R_4$, which may be the same or different, are hydrogen or alkyl;
X is hydrogen or carboxyl or alkoxycarbonyl;
and the pharmacologically compatible salts thereof.

The alkyl radicals $R_1$, $R_2$, $R_3$ and $R_4$ can contain up to 6 carbon atoms and preferably contain up to 3 carbon atoms; this also applies to the alkyl radical in the alkoxycarbonyl substituent X.

The new compounds (I) according to the present invention possess valuable therapeutic properties; they lower the cholesterol and triglyceride level in blood serum and thus are suitable for the treatment and prophylaxis of coronary-arterial diseases and of artherosclerosis.

The new compounds (I) according to the present invention can be prepared, for example, by reacting a phenolic compound of the formulae:

$$HO - \text{[indole]} - X \quad (II),$$

wherein $R_1$ and X have the same meanings as above, or a salt thereof, with a compound of the general formula:

$$Z - \underset{\underset{R_3}{|}}{\overset{\overset{R_2}{|}}{C}} - COOR_4 \quad (III),$$

wherein $R_2$, $R_3$ and $R_4$ have the same meanings as above and Z is a reactive residue; or with a compound of the general formula:

$$R_2' - CO - R_3' \quad (IV),$$

wherein $R_2'$ and $R_3'$, which may be the same or different, are alkyl radicals, in the presence of a tri- or tetrahalogenated methane derivative and of a strong base, whereafter the substituents $R_4$ and X can be changed, if desired, in known manner and when a compound is obtained in which $R_1$ is a hydrogen atom, this can, if desired, be alkylated on the nitrogen atom and the compound obtained is, if desired, converted into a pharmacologically compatible salt.

The reactive residue Z is in the compounds of general formula (III) is preferably an acid residue, for example a residue of a hydrohalic acid or of a sulphonic acid.

In the reaction of the compounds (II) and (III), it is preferred to use the phenolates, which can be prepared in situ in the usual manner, the corresponding sodium and potassium salts being particularly preferred. The reaction can be carried out in an inert diluent or solvent, for example, in an aromatic hydrocarbon, dimethyl formamide, acetone, methyl ethyl ketone or alcohol. The reaction can be carried out at ambient temperature or at an elevated temperature.

As tri- or tetrahalogenated methane derivatives, there can be used, for example, chloroform, bromoform or carbon tetrachloride, chloroform being preferred.

As strong bases, there can be used the alkali metal hydroxides, for example potassium hydroxide, preferably in solid form. The reaction is carried out in an inert diluent or solvent. It is also preferable to use the compounds of general formula (IV) in excess.

If desired, the conversion of the residues $R_4$ and X can be carried out according to known methods. Thus, for example, compounds in which $R_4$ is a hydrogen atom and/or X is a carboxyl group or salts thereof can readily be reacted with alcohols to give the corresponding esters and compounds in which $R_4$ is an alkyl radical and X is an alkoxycarbonyl radical can be saponified or transesterified in the usual way.

When it is subsequently desired to carry out an N-alkylation of compounds of general formula (I) in which $R_1$ is a hydrogen atom, this can be carried out in a conventional manner, preferably with reactive alkyl compounds, for example alkyl halides or dialkyl sulphates.

For the conversion of compounds of general formula (I) into their pharmacologically compatible salts, these can be reacted with, for example, bases of the alkali metal or alkaline earth metal series or with basic aluminum compounds or ammonia or with non-toxic organic amines.

The following Examples illustrate, without limitation, the preparation of the compounds of the present invention:

EXAMPLE 1

Dimethyl-(1-methyl-2-carboxy-5-indolyloxy)-acetic acid

Process a 0.75 g. sodium hydride were introduced, under an atmosphere of nitrogen, into a solution of 6.1 g. methyl 1-methyl-5-hydroxyindole-2-carboxylate in 100 ml. dimethyl formamide and the reaction mixture stirred for 1 hour. Thereafter, 8.5 g. ethyl α-bromo-α-methyl-propionate were added thereto and the reaction mixture further stirred for 12 hours at ambient temperature. The reaction mixture was then evaporated to dryness under reduced pressure and the residue was taken up in 50 ml. water and shaken out will methylene chloride. The methylene chloride extracts were washed with a dilute aqueous solution of sodium hydroxide and then with water and thereafter evaporated to dryness. The oily residue was taken up in a little methylene chloride and purified chromatographically over a column of 100 g. basic aluminum oxide (activity stage II). After evaporation of the eluate, the initially oily product solidified after standing for a long time to give crystalline ethyl dimethyl(1-methyl-2-methoxycarbonyl-5-indolyloxy)-acetate. This was suspended in 50 ml. alcoholic 1N sodium hydroxide solution and heated under reflux for 1 hour, while stirring. Thereafter, the alcohol was distilled off, the residue was mixed with 30 ml. water and the solution obtained was acidified with hydrochloric acid. The acid which thereby crystallized out was filtered off with suction and dried. After recrystallization from alcohol, there were obtained 5.6 g. dimethyl-(1-methyl-2-carboxy-5-indolyloxy)-acetic acid, which has a melting point of 190°–192°C 192°C.

For the preparation of the corresponding disodium salt, 2.77 g. (0.01 mole) of this dicarboxylic acid were dissolved in 30 ml. alcohol, mixed with 20 ml. of a 1N aqueous solution of sodium hydroxide and evaporated to dryness under reduced pressure. The solid residue of the desired disodium salt thus obtained was recrystallized from water-isopropanol. It melted, with decomposition, at 300°C.

The methyl 1-methyl-5-hydroxyindole-2-carboxylate (m.p. 145°– °C., after recrystallization from methanol) used as starting material was obtained by the methylation of methyl 5-benzyloxy-indole-2-carboxylate (see J. Chem. Soc., 1943, 49) and subsequent debenzylation by catalytic hydrogenation in the presence of a palladium/charcoal catalyst.

Process b 5.60 g. methyl 1-methyl-5-hydroxyindole-2-carboxylate were dissolved in 100 ml. anhydrous acetone. 15 g. powdered potassium hydroxide were added thereto, followed by a solution of 10 ml. chloroform in 20 ml. acetone, with efficient stirring. The reaction mixture thereby heated up considerably. It was stirred for a further 2 hours, then poured into 100 ml. water, the remaining acetone was substantially distilled off under reduced pressure, shaken out twice with 50 ml. amounts of ether and subsequently acidified with hydrochloric acid. The acid which precipitated out was filtered off with suction and recrystallized twice from dilute alcohol. The dimethyl-(1-methyl-2-carboxy-5-indolyloxy)-acetic acid thus obtained has a melting point of 189°–191°C. and the yield was 2.5 g.

EXAMPLE 2

Methyl dimethyl-(1-methyl-2-methoxycarbonyl-5-indolyloxy)-acetate 4 g. N,N'-carbonyldiimidazole were added to a solution of 2.80 g. dimethyl-(1-methyl-2-carboxy-5-indolyloxy)-acetic acid (prepared in the manner described in Example 1) in 30 ml. dimethyl formamide and the reaction mixture left to stand for 1 hour. thereafter, 10 ml. methanol and 0.5 g. sodium hydride were added thereto, whereupon the reaction mixture was left to stand for a further 2 hours. Subsequently, 50 ml. amounts of methylene chloride and of water were added thereto and the layers were separated. The methylene chloride phase was washed several times with water, dried over anhydrous sodium sulphate and then evaporated to dryness under reduced pressure. The residue was recrystallized from methanol. There were obtained 2.2 g. methyl dimethyl-(1-methyl-2-methoxycarbonyl-5-indolyloxy)-acetate, which has a melting point of 56°–57°C.

EXAMPLE 3

Ethyl (1-methyl-5-indolyloxy)-acetate

In a manner analogous to that described in Example 1, 5.9 g. 1-methyl-5-hydroxy-indole were dissolved in 75 ml. dimethyl formamide and 1.0 g. sodium hydride introduced into the solution under an atmosphere of nitrogen. After stirring for 1 hour, 10 g. ehtyl α-bromoacetate were added thereto and the reaction mixture further stirred for 10 hours at ambient temperature. Thereafter, the reaction mixture was worked up in the manner described in Example 1. The residue obtained by evaporation of the methylene chloride extracts was purified chromatographically over 100 g. basic aluminum oxide (activity stage II), with the use of methylene chloride as solvent. The residue obtained after evaporation of the eluate was crystallized from etherligroin. There were thus obtained 5.5 g. ethyl (1-methyl-5-indolyloxy)-acetate, which has a melting point of 97°–99°C.

The 1-methyl-5-hydroxy-indole (m.p. 140°–142°C.) used as starting material was obtained by the methylation of 5-benzyloxy-indole (see J.A.C.S., 76, 5583) and subsequent debenzylation by catalytic hydrogenation in the presence of a palladium/charcoal catalyst.

EXAMPLE 4

Ethyl dimethyl-(2-methoxycarbonyl-5-indolyloxy)-acetate 5.7 g. methyl 5-hydroxyindole-2-carboxylate (see J. Chem. Soc., 1943, 49) and 10 g. ethyl α-bromo-α-methylpropionate were dissolved in 100 ml. dimethyl formamide and, after the addition of 6.2 g. anhydrous potassium carbonate, heated to 80°C. for 20 hours, while stirring. Thereafter, 100 ml. amounts of methylene chloride and of water were added thereto and the methylene chloride phase is separated off. This methylene chloride solution was washed 3 times with 200 ml. amounts of water, dried over anhydrous sodium sulphate and then evaporated to dryness. For purification, the evaporation residue was taken up in methylene chloride and chromatographed over a column of basic aluminum oxide (activity stage II). The eluate was evaporated to dryness and the residue was recrystallized from toluene. There were thus obtained 5.5 g. pure ethyl dimethyl-(2-methoxycarbonyl-5-indolyloxy)-acetate which has a melting point of 117°–119°C.

EXAMPLE 5

Ethyl dimethyl-(5-indolyloxy)-acetate

In a manner analogous to that described in Example 4, 9.3 g. 5-hydroxyindole (see J. Chem. Soc., 1943, 49) were reacted with 20.5 g. ethyl α-bromo-α-methylpropionate, with the addition of 14.5 anhydrous potassium carbonate, in 150 ml. dimethyl formamide. After heating for 20 hours at 80°C., there were added 150 ml. amounts of water and of methylene chloride and the methylene chloride phase was separated off. This methylene chloride solution was then washed with water, evaporated to dryness and the residue obtained was distilled in a vacuum. The product distilled over at 170°C./$10^{-3}$ mm.Hg. and solidified upon cooling. After recrystallization from ether/ligroin, there were obtained 10.5 g. ethyl dimethyl-(5-indolyloxy)-acetate, which has a melting point of 72°–73°C.

EXAMPLE 6

Dimethyl-(2-carboxy-5-indolyloxy)-acetic acid 5.25 g. ethyl dimethyl-(2-methoxycarbonyl-5-indolyloxy)-acetate (prepared in the manner described in Example 4) were heated under reflux for 1 hour in 50 ml. 1N alcoholic sodium hydroxide solution, while stirring. Thereafter, the alcohol was distilled off, the residue was taken up in 30 ml. water and the clear solution obtained was acidified with hydrochloric acid. After standing for some time, the precipitated acid was filtered off with suction and recrystallized from dilute alcohol. There were obtained 4.3 g. pure dimethyl-(2-carboxy-5-indolyloxy)-acetic acid, which has a melting point of 202°–205°C.

EXAMPLE 7

Dimethyl-(5-indolyloxy)-acetic acid

In a manner analogous to that described in Example 6, 5 g. ethyl dimethyl-(5-indolyloxy)-acetate (prepared in the same manner described in Example 5) were saponified in 50 ml. 1N alcoholic sodium hydroxide solution. The acid obtained after acidification with hydrochloric acid, was recrystallized from toluene. There were obtained 4.1 g. of colorless crystals of dimethyl-(5-indolyloxy)-acetic acid, which has a melting point of 106°C.

EXAMPLE 8

(1-Methyl-5-indolyloxy)-acetic acid

In a manner analogous to that described in Example 6, 5 g. ethyl (1-methyl-5-indolyloxy)-acetate (prepared in the manner described in Example 3) were saponified in 50 ml. 1N alcoholic sodium hydroxide solution. Upon cooling the solution, the sodium salt of the acid crystallized out. The yield was 4.6 g. and it has a melting point of 317°–319°C. The sodium salt was suspended in 50 ml. water and (1-methyl-5-indolyloxy)-acetic acid was precipitated out by the addition of hydrochloric acid. After recrystallization from dilute alcohol, there were obtained 3.8 g. (1-methyl-5-indolyloxy)-acetic acid, which has a melting point of 174°–176°C.

EXAMPLE 9

(1-Methyl-2-carboxy-5-indolyloxy)-acetic acid

In a manner analogous to that described in Example 1 a), 10.2 g. methyl 1-methyl-5-hydroxyindole-2carboxylate were dissolved in 100 ml. dimethyl formamide and 1.2 g. sodium hydride introduced into the solution under an atmosphere of nitrogen. After stirring for 1 hour, 10 g. ethyl α-bromoacetate were added thereto and the reaction mixture further stirred for 10 hours at ambient temperature. Thereafter, the reaction mixture was worked up in the manner described in Example 1. In this manner, there were obtained 9.7 g. ethyl (1-methyl-2-carbomethoxy-5-indolyloxy)-acetate. After recrystallization from methanol, the ester had a melting point of 62°–64°C.

This ester could then be saponified, in the manner analogous to that described in Example 1 (a), with the use of alcoholic 1N sodium hydroxide solution, 6.8 g. (1-methyl-2-carboxy-5-indolyloxy)-acetic acid thereby being obtained. After recrystallization from methanol, the acid had a melting point of 254°–256°C.

EXAMPLE 10

Dimethyl-(1-propyl-2-carboxy-5-indolyloxy)-acetic acid 5 g. ethyl dimethyl-(2-methoxycarbonyl-5-indolyloxy)-acetate (see Example 4) were dissolved in 30 ml. dimethyl formamide and 0.5 g. sodium hydride was introduced into the solution. After stirring the reaction mixture for 1 hour, 3.5 g. propyl iodide were added thereto and the reaction mixture further stirred for 3 hours at 60°C. Subsequently, the reaction mixture was mixed with 100 ml. methylene chloride and repeatedly shaken out with water. The remaining methylene chloride solution was dried over anhydrous sodium sulphate and then evaporated. There were obtained 5.5 g. ethyl dimethyl-(1-propyl-2-methoxycarbonyl-5-indolyloxy)-acetate which was saponified with alcoholic 1N sodium hydroxide solution to give 4.5 g. dimethyl-(1-propyl-2-carboxy-5-indolyloxy)-acetic acid. After recrystallization from dilute alcohol, this acid had a melting point of 150°–152°C.

As indicated above, compounds of the present invention possess valuable therapeutic properties in that they are capable of lowering the cholesterol and triglyceride level in blood serum, thus making them suitable for the treatment and prophylaxis of coronary-arterial diseases and of artherosclerosis.

Male rats having a weight of about 200 to 220 g. (a group of 10 animals constituted the test population for each test compound used, i.e., for each value reported in the table below) were administered the test compounds, as well as "Clofibrat," as a comparison substance, using a stomach probe, for 7 days, p.o., the control animals received only the corresponding suspension medium.

Upon completion of the tests, the animals were killed, exsanguinated, and their serum was determined for cholesterol content according to the method of Watson (Watson, D., CLIN. CHIM. ACTA, 5, 637, 1960)

The results are set forth in the Table below.

| Test Compound | Dosage mg/kg | Depression of Cholesterol Level (% relative to control) |
|---|---|---|
| Dimethyl-(2-carboxy-5-indolyloxy)-acetic acid | 25 | 12 |
| Dimethyl-(5-indolyloxy)-acetic acid ethylester | 25 | 23 |
| Dimethyl-(1-methyl-2-carboxy-5-indolyloxy) acetic acid | 25 | 20 |
| Clofibrat | 25 | 7* |

*Insignificant depression

From the above it can be seen that the new substances are superior to the known anti-hyperlipidaemic, Clofibrat, in particular with respect to cholesterol-reducing action.

The novel compounds may be administered by themselves or in conjunction with carriers which are pharmacologically acceptable, either active or inert. The dosage units are similar to those of the heretofore known anti-cholesterol agents, e.g., about 1 to 2 grams per day for an adult or about 30 mg/kg per day, although higer or lower dosages can be used. Rather than a single dose, it is preferable if the compounds are administered in the course of day, i.e., about four applications of 500 mg each at spaced time intervals or 8 of about 250 mg each. A convenient form of administration is in a gelatin capsule.

The new compounds (I) according to the present invention and the salts thereof can be administered enterally or parenterally, in admixture with liquid or solid pharmaceutical diluents or carriers, as therapeutic agents. As an injection medium, it is preferred to use water which contains the usual additives for injection solutions, for example, stabilizing agents, solubilizing agents and/or buffers. Additives of this type include, for example, tartrate and citrate buffers, ethanol, complex-forming agents, such as ethylenediaminetetraacetic acid and the nontoxic salts thereof, and high molecular weight polymers, for example liquid polyethylene oxide. Solid carrier materials include, for example, starch, lactose, mannitol, methyl-cellulose, talc, highly-dispersed silicic acids, high molecular weight fatty acids, for example stearic acid, gelatine, agar-agar, calcium phosphate, magnesium stearate, animal and vegetable fats and solid high molecular weight polymers, for example polyethylene glycols. Compositions which are suitable for oral administration can, if desired, contain flavoring and/or sweetening agents.

It will be appreciated that the instant specification and examples are set forth by way of illustration and not limitation, and that various modifications and changes may be made without departing from the spirit and scope of the present invention.

What is claimed is:

1. New (5-indolyloxy)-acetic acid compounds of the formula

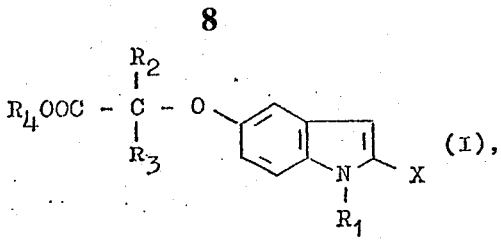

wherein:
$R_1$, $R_2$, $R_3$ and $R_4$ are individually selected from hydrogen or lower alkyl;
X is hydrogen, carboxyl, or alkoxy carbonyl;
and the pharmacologically acceptable salts thereof.

2. Compound as claimed in claim 1, wherein $R_1$ is hydrogen.

3. Compound as claimed in claim 1, wherein $R_2$ is hydrogen.

4. Compound as claimed in claim 1, wherein $R_3$ is hydrogen.

5. Compound as claimed in claim 1, wherein $R_4$ is hydrogen.

6. Compound as claimed in claim 1, wherein X is hydrogen.

7. Compound as claimed in claim 1, wherein X is carboxyl.

8. Compound as claimed in claim 1, wherein X is alkoxycarbonyl of 1 to 6 carbon atoms in the alkoxy moiety.

9. Compound as claimed in claim 1, designated dimethyl-(1-methyl-2-carboxy-5-indolyloxy)-acetic acid.

10. compound as claimed in claim 1, designated ethyl dimethyl-(5-indolyloxy)-acetate.

11. Compound as claimed in claim 1, designated dimethyl-(2-carboxy-5-indolyloxy)-acetic acid.

* * * * *